United States Patent [19]

Magrath

[11] 4,317,530
[45] Mar. 2, 1982

[54] PISTON OPERATED PUMP FOR VISCOUS MATERIALS

[75] Inventor: Joseph M. Magrath, McCook, Nebr.

[73] Assignee: Merck & Co., Inc., Rahway, N.J.

[21] Appl. No.: 108,934

[22] Filed: Dec. 31, 1979

[51] Int. Cl.³ .............................................. B67D 5/02
[52] U.S. Cl. .................................... 222/309; 222/66; 222/186; 222/341
[58] Field of Search ............... 222/185, 341, 340, 179, 222/181, 309, 186

[56] References Cited

U.S. PATENT DOCUMENTS

| | | | |
|---|---|---|---|
| 1,230,061 | 6/1917 | Blanchette | 222/341 X |
| 1,349,994 | 8/1920 | Wood | 222/179 |
| 2,488,266 | 11/1949 | Brenn | 222/341 X |
| 2,661,874 | 12/1953 | Appell | 222/341 |
| 2,765,964 | 10/1956 | Hanlon | 222/340 |
| 3,248,950 | 5/1966 | Pursell et al. | |
| 3,492,876 | 2/1970 | Bull et al. | 222/309 X |

Primary Examiner—Stanley H. Tollberg
Attorney, Agent, or Firm—David L. Rose; Harry E. Westlake

[57] ABSTRACT

Disclosed is an improved piston operated pump for viscous materials wherein the entrapment of air bubbles in the viscous material is reduced by placing a spring in the pump cylinder. The spring is the same diameter as the pump cylinder and is about as long as the length of travel of the piston. The spring is conical in shape so that it may be fully compressed without substantially affecting the capacity of the pump cylinder or the length of the piston stroke.

1 Claim, 4 Drawing Figures

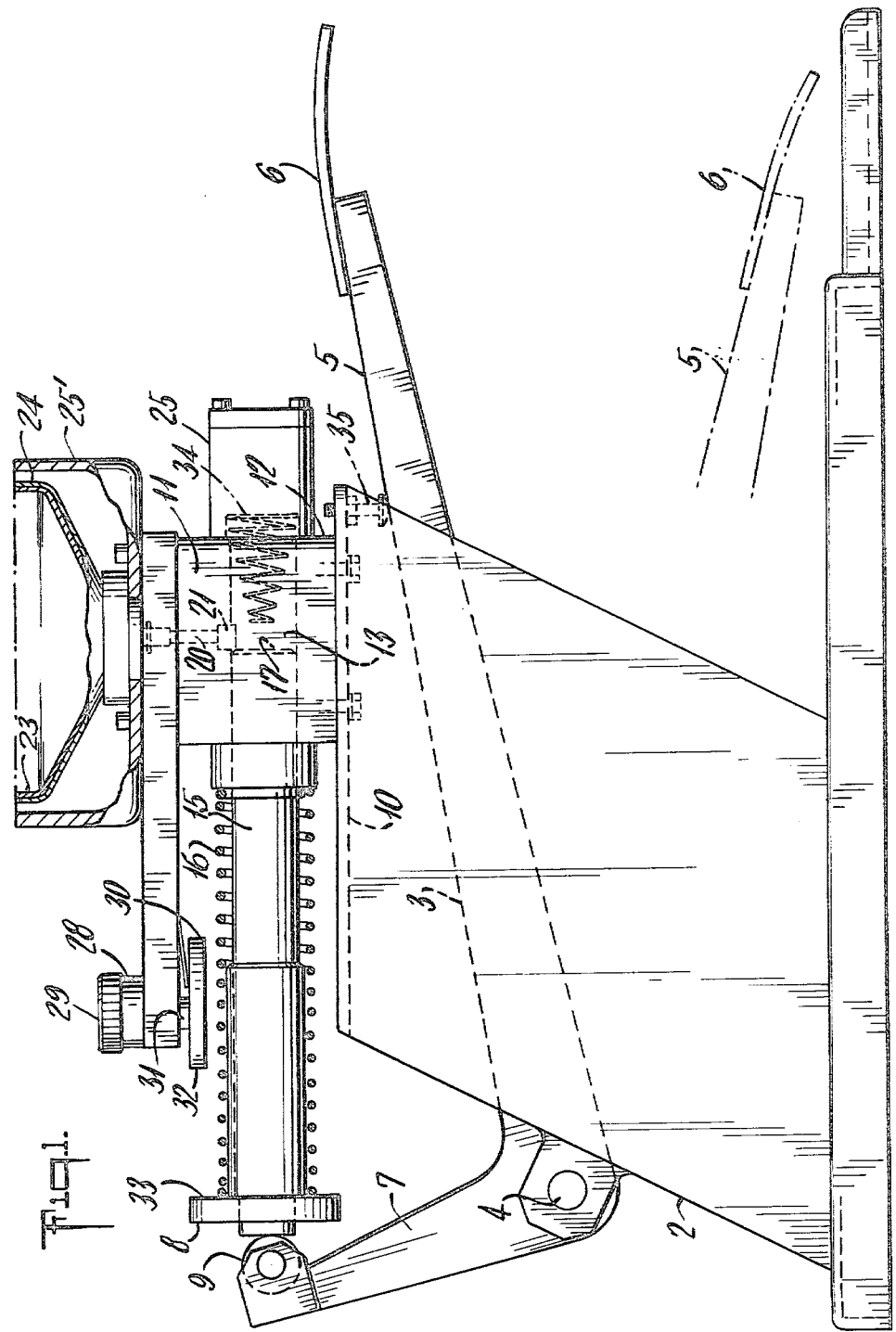

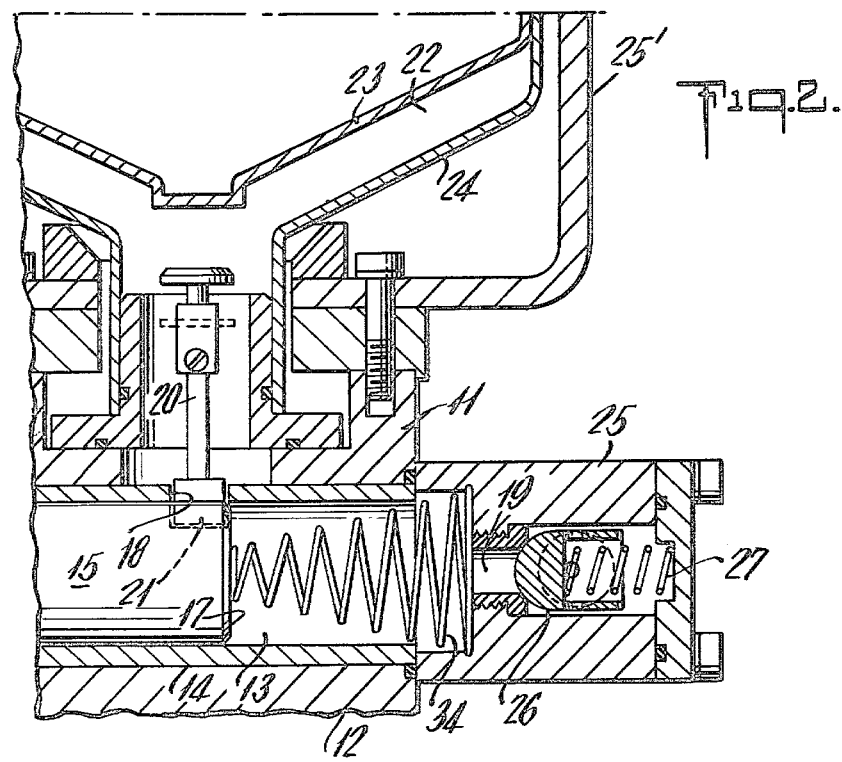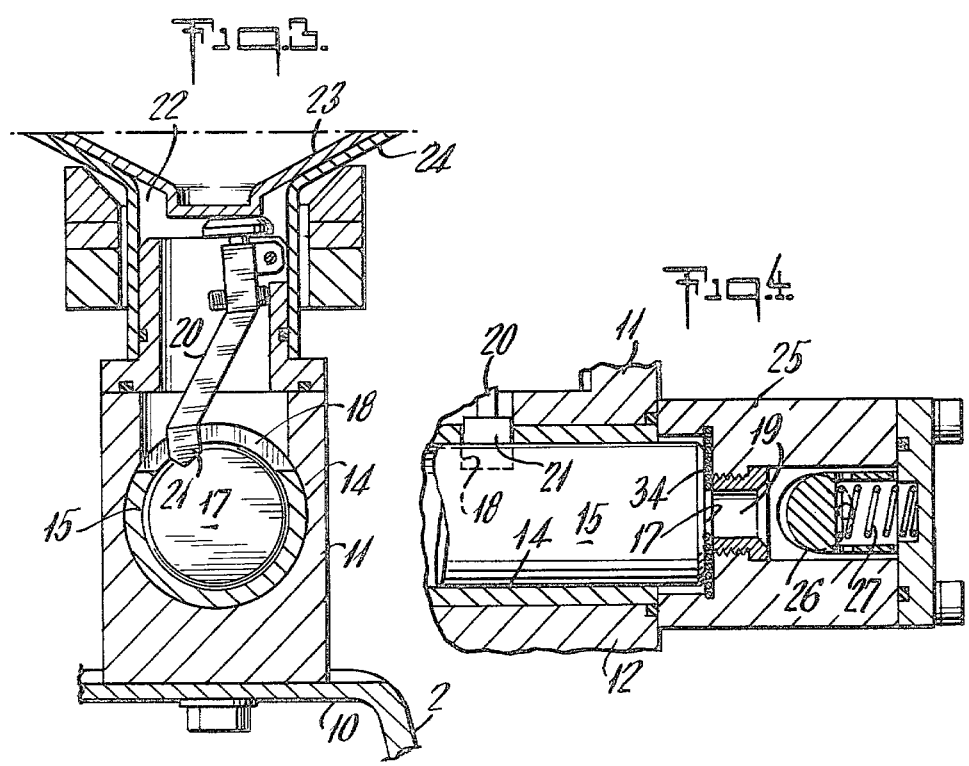

PISTON OPERATED PUMP FOR VISCOUS MATERIALS

BACKGROUND OF THE INVENTION

The administration of veterinary medicines is very often accomplished by suspending such medicine in a viscous paste for oral administration to the animal. This has the advantage of providing for a highly concentrated formulation thus affording a small dose volume. This is particularly advantageous with medicines of low solubility where a drench, or orally administered aqueous solution, would necessitate a very large volume of solution. This would be particularly so for large animals. The viscous paste also has an advantage over a tablet or bolus which is orally administered because the paste is generally formulated to a tacky consistency so that when the paste is placed in the mouth of an animal, it sticks thereto so that the animal cannot expel the paste, which the animal generally can easily do in the case of a tablet or bolus. The normal mouth and tongue movements of the animal cause the paste to be slowly swallowed by the animal.

The administration of the veterinary paste may be accomplished with a piston operated paste dispenser. In one variation of such a dispenser, a large capacity reservoir is provided such that a large number of animals may be treated before the reservoir must be changed. The reservoir feeds the paste to a cylindrical piston operated pump, which provides the force to eject the paste into the mouth of the animal being treated.

The pump also generally provides some means of varying the size of the dose of veterinary paste such that animals of different sizes, weights, ages and physical conditions may be treated. It is most convenient to provide for a single full stroke of the piston which will deliver a dose adequate to treat the largest animal contemplated for treatment. Smaller animals may be treated by shortening the distance that the piston travels. However, in providing for such fractional doses, particularly when many fractional doses are provided sequentially, it has been observed that large air bubbles may form in the cylinder. The large air bubbles may originate as small air bubbles constrained within the paste, which in the confines of the cylinder, and during repeated fractional dosages accumulate to form larger and larger bubbles. These bubbles in the cylinder will not be ejected until the next full stroke of the piston. While these large air bubbles are trapped in the cylinder the dosage volume and accuracy are reduced, since the air bubbles not only take up part of the cylinder volume, but are also compressed during the ejection of the paste. As the piston travels to force the paste out of the cylinder, the force is used to compress the air bubble instead of providing an accurate dose of paste. The inaccurate dosages can severely effect the health of the animals being treated.

The instant invention provides for means to prevent the accumulation of such large air bubbles in the pump cylinder by inserting a conical spring within the cylinder. The conical spring is the same diameter as said cylinder and of about the same length as the piston travel during a full dosing stroke.

SUMMARY OF THE INVENTION

The accumulation of air bubbles in the veterinary paste is thus seen to be detrimental and to be avoided if the accuracy of the volume of the dose of such paste is to be insured. A conical spring inserted into the cylinder of the paste dispenser prevents the formation of large air bubbles from the small bubbles normally present in the paste.

Thus, it is an object of this invention to describe the piston operated pump which is used for administering the viscous veterinary paste. A further object of this invention is to describe the conical spring which fits inside the cylinder of the piston operated pump. Other objects will become apparent from the following description, taken in conjunction with the accompanying drawings.

DESCRIPTION OF THE INVENTION

As aformentioned, this invention finds utility in any piston-type dispenser of viscous materials where the accumulation of air bubbles may become significant after a series of fractional doses. The air bubbles most likely originate from very small bubbles always present in the paste, or perhaps from small sources of air in the equipment itself. The presence of these very small bubbles is not significant and has been compensated for in the dosage calculations for the paste. With full strokes of the piston, these small bubbles cannot accumulate and thus have no effect. However, if larger bubbles accumulate, the accuracy of the dosage is adversely effected, since the bubbles are compressable and cause less than the desired dose to be administered to the animal. In order to regain the dose accuracy, the bubbles must be expelled by completely emptying the cylinder with a full stroke. However, not only must the cylinder be emptied, but so too must the outlet hose and the accompanying mouth insertion equipment. Since such hose and equipment may reach a length of about 2 meters, considerable medicated paste must be expelled, and lost, before accurate dosages are achieved again.

The instant conical spring has been found to insure the accuracy of dosages of such medicated or other viscous pastes. One example of equipment which is used for such purposes, and can be improved by the use of the instant invention is shown in the accompanying drawings, in which the reference numbers in each drawing refer to the same structural piece throughout.

FIG. 1 is a planar drawing, partially in cross section of a foot operated, piston-type, paste dispensing pump, showing the cylinder and piston, paste reservoir, dosage adjusting means, piston activating means, and associated structural components.

FIGS. 2, 3 and 4 are all enlarged over the view of FIG. 1, and all are enlarged to the same degree.

FIG. 2 is an enlarged cross sectional view of the cylinder and piston area of the paste dispensing pump, with the associated paste reservoir, and piston stop means and showing the piston just beginning the process of dispensing the paste.

FIG. 3 is a cross section of the cylinder with the piston in a fully retracted position and the piston stop indicating an empty reservoir and preventing further movement of the piston.

FIG. 4 is a cross sectional view of the cylinder and piston showing the piston at the end of a full dosing stroke, with the conical spring fully collapsed into a completely flattened shape and the check value in a retracted position.

The instant invention is more particularly described with reference to the following specific features shown in the drawings:

In FIG. 1 the overall structure of the pump is shown as a foot operated pump consisting of a base 1 with a vertical support 2 with the piston activating means 3 attached thereto. The piston activating means consists of two rigidly attached arms of unequal length rotating about a pivot 4. The longer arm 5 has a foot pad 6 attached to the end thereof. The shorter arm 7 is in direct contact with the end cap 8 of the piston through a roller 9 to insure a friction free contact.

The pump support plate 10 is rigidly attached to the vertical support member 2 and the pump assembly 11 mounted thereon. The pump assembly consists of a housing 12 with an opening therethrough of circular cross-section forming the pump cylinder 13. The inside of the pump cylinder is fitted with a liner 14 of hardened metal such as bronze to insure a long operating life of the pump.

The piston 15 is slidably mounted inside the cylinder 13 and is in direct contact with the cylinder liner 14. The piston 15 is provided with an end cap 8 and a return spring 16, which maintains the front face 17 of the piston a predetermined distance away from the discharge end of the cylinder. The maximum dose size of the paste dispenser is determined by the travel of the piston as it closes off the inlet 18. Minor until the piston travel stops at the outlet end of cylinder. Variations of this distance may be accomplished by using suitable stroke length adjusting means such as a threaded screw 35.

The cylinder 13 is also provided with an inlet 18 and an outlet 19. The inlet is positioned between the outlet and the rest position of the piston. The inlet is provided with a piston stop 20 which is normally biased such that the leading edge thereof 21 is outside the confines of the cylinder. The piston stop is pushed into the cylinder when the reservoir 22 of viscous material is empty and the sliding cap 23 engages the piston stop 20. This is shown in FIG. 2 where the broken lines indicate the position of the piston stop 20 when the reservoir 22 is empty and the sliding cap 23 has engaged the piston stop. FIG. 3 shows the piston in a fully retracted position and the piston stop in engagement therewith preventing any forward movement of the piston. The vacuum of the piston 15 on the return stroke pulls the paste into the cylinder 13 and, at the last dose, the action of the sliding cap forces the piston stop into the cylinder such that the piston 15 cannot proceed towards the outlet end of the cylinder.

The reservoir 22 is filled and refilled by inserting a cannister 24 containing the medicated paste into the cannister holder 25.

When the piston stop 20 prevents further action of the piston indicating that the reservoir 22 is empty, the cannister 24 is removed and replaced by a new cannister. The piston stop is brought back to its normal position with biasing means such as a spring.

The outlet 19 of the cylinder is covered by the outlet assembly 25 which contains the check valve 26, check valve spring 27 and the outlet hose. The check valve is normally maintained in position against the flow of medicated paste such that pressure from the pumping action of the piston 15 will compress the check valve spring allowing the check valve to move backwards and the paste to flow out. The action of the spring will return the check valve to its normal position against the outlet when the forward motion of the piston ceases and prevents any viscous material from returning to the cylinder through the outlet during the piston back stroke.

The dose size of the medicated paste dispensed with this pump is determined by the dose setting assembly 28. The dose setting assembly consists of an upper knob 29 and a lower dose setting means 30, which is of polygonal shape, the number of sides of the polygon determining the number of dosages. The polygon is mounted offset of its center on the mounting shaft 31 such that rotation of the upper knob causes the dose limiting face of the polygon 32, which is closest to the contact surface 33 of the piston end cap 8, to engage said contact surface and prevent further travel of the piston 15. The offset polygonal shape of the dose setting means causes the dose limiting face of the polygon 32 to protrude varying distances towards the piston end cap 8 as the dose setting assembly 28 is rotated thus causing different piston travel distances and proportionally different dosages. The dose limiting assembly 28 may also have indicator means to show the dose being administered or more conveniently the weight of the animal which would be properly treated with an indicated dose setting. Also retaining means, such as a "click-stop" would prevent the dose setting from inadvertently being changed during use. Another convenient type of retaining means would require the knob to be first lifted and then turned to change dosages.

Inside the cylinder 13 is the instant improvement in this invention, the truncated conical spring 34. The spring is preferably of the same diameter as the cylinder and is oriented with its larger diameter end at the outlet 19 of the cylinder. The cylindrical shape of the conical spring is truncated and the smaller diameter end is close to the front face 17 of the piston 15. The length of the spring is preferably substantially the same as the maximum distance of the front face 17 of the piston 15 from the outlet. During the power stroke of the piston 15, the conical spring 34 is compressed and during such process agitates the paste such that, during partial strokes, small air bubbles do not accumulate into large air bubbles.

The spring also is preferably constructed such that during a full stroke of the piston, when the front face 17 of the piston 15 is at its closest point to the outlet 19, the conical spring is substantially flat and occupies a minimum volume of the cylinder. In this manner the full stroke of the piston is not interfered with by the presence of the spring.

It appears that the accumulation of large air bubbles during fractional dosages is caused by the restrained movement of the paste in the outlet area of the cylinder, in that portion closest to the cylinder walls. The paste, during a partial dose would be pushed out the outlet primarily in the vicinity of the outlet. The normal laminar flow of the paste would cause the paste closest to the cylinder walls to move slower, and thus, during a partial stroke, not be ejected from the cylinder.

During the ejection stroke of the piston, the coils of the conical spring are seen to compress first in the areas where the diameter of the coils is largest. Thus, the coils compress in just the area where the flow of the paste is slowest. This motion of the spring coils agitates the somewhat stagnant paste and promotes the ejection of the paste from the cylinder, and thus prevents the accumulation of bubbles in the slower moving areas of the paste.

While this theory as to the successful operation of the conical spring in the paste dispensing pump is believed to be as accurate as possible, such theory is presented only in order to provide for a better understanding of this invention, and the inventor is not be bound by such theory.

What is claimed is:

1. In a paste dispensing pump comprising:
   (a) a cylindrical chamber with an outlet at one end and an inlet through the side of the cylindrical chamber a fixed distance away from the outlet;
   (b) a piston, slidably mounted within the cylindrical chamber and normally at rest at a position which is a greater distance away from the outlet than is the inlet;
   (c) means for slidably moving the piston from its position of rest towards the outlet all or part or such distance;
   (d) a reservoir of relatively viscous paste material connected to said inlet;
   (e) a check value connected to said outlet whereby said viscous material is allowed to exit the cylindrical chamber upon the operation of the slidable piston but material is not allowed to return to said cylindrical chamber through said outlet; the improvement comprising a truncated conical spring mounted inside the cylindrical chamber arranged such that the larger, diameter end of the spring is at the outlet of the cylindrical chamber and the smaller diameter end of the conical spring is closest to the piston and the maximum diameter of said spring is substantially the same as the diameter of said cylinder, the length of said spring is substantially the same as the maximum length of travel of the piston and the spring is compressible into a substantially flat shape by the operation of a full stroke of said piston, whereby said spring is compressed by the action of said piston and whereby the compressing action of such spring prevents the accumulation of air bubbles within such paste when said piston travels less than its full length of travel.

* * * * *